United States Patent
Forster

(10) Patent No.: US 8,289,165 B2
(45) Date of Patent: Oct. 16, 2012

(54) RFID DEVICE WITH CONDUCTIVE LOOP SHIELD

(75) Inventor: Ian J. Forster, Essex (GB)

(73) Assignee: Avery Dennison Corporation, Pasadena, CA (US)

( * ) Notice: Subject to any disclaimer, the term of this patent is extended or adjusted under 35 U.S.C. 154(b) by 1028 days.

(21) Appl. No.: 12/136,946

(22) Filed: Jun. 11, 2008

(65) Prior Publication Data

US 2009/0309703 A1 Dec. 17, 2009

(51) Int. Cl.
*G08B 13/14* (2006.01)
(52) U.S. Cl. .................. 340/572.7; 235/375; 343/743
(58) Field of Classification Search .... 340/572.1–572.9; 235/375–385; 343/743, 748
See application file for complete search history.

(56) References Cited

U.S. PATENT DOCUMENTS

| | | | |
|---|---|---|---|
| 5,970,398 A * | 10/1999 | Tuttle | 455/193.1 |
| 7,070,101 B2 | 7/2006 | Deguchi et al. | |
| 7,079,084 B2 | 7/2006 | Notohara et al. | |
| 7,142,163 B2 | 11/2006 | Fukano et al. | |
| 7,268,687 B2 * | 9/2007 | Egbert et al. | 340/572.7 |
| 2005/0093677 A1 * | 5/2005 | Forster et al. | 340/10.1 |
| 2006/0055617 A1 | 3/2006 | Hall | |
| 2010/0007570 A1 * | 1/2010 | Sardariani et al. | 343/797 |

FOREIGN PATENT DOCUMENTS

| | | |
|---|---|---|
| EP | 0996124 | 4/2000 |
| JP | 2001326526 | 11/2001 |
| WO | 2004055721 | 7/2004 |

OTHER PUBLICATIONS

International search report and written opinion issued in corresponding International application PCT/US2009/046370 dated Dec. 21, 2009.
International preliminary report on patentability issued in corresponding International application PCT/US2009/046370 dated Dec. 23, 2010.

\* cited by examiner

*Primary Examiner* — George Bugg
*Assistant Examiner* — Edny Labbees
(74) *Attorney, Agent, or Firm* — Avery Dennison Corporation

(57) ABSTRACT

A radio frequency identification (RFID) device includes a conductive loop shield for a loop antenna. The shield may overlap the conductive loop antenna. The preferred frequency of operation may be a frequency or range of frequencies within the ultra high frequency (UHF) range of frequencies. The conductive loop shield provides a distributed capacitance to the loop antenna, which brings the inductance of the combined system of the loop antenna and the conductive shield down to an inductance level that allows impedance matching with the RFID chip (at the desired impedance or range of impedances). The use of the conductive loop allows the RFID device to function as a near-field magnetic communication device, utilizing a loop antenna having a larger area than would normally be possible for impedance-matching with RFID chip. The loop antenna and the conductive shield loop may be on opposed major surfaces of a dielectric material layer.

17 Claims, 5 Drawing Sheets

RFID DEVICE WITH CONDUCTIVE LOOP SHIELD

BACKGROUND OF THE INVENTION

1. Technical Field of the Invention

The invention is in the field of radio frequency identification (RFID) devices, and methods for configuring and manufacturing RFID devices.

2. Description of the Related Art

Radio frequency identification (RFID) tags and labels (collectively referred to herein as "devices") are widely used to associate an object with an identification code or other information. For example, RFID tags are used in conjunction with security locks in cars, for access control to buildings, and for tracking inventory and parcels. RFID devices generally have a combination of antennas and analog and/or digital electronics, which may include for example communications electronics, data memory, and control logic.

As noted above, RFID devices are generally categorized as labels or tags. RFID labels are RFID devices that are adhesively or otherwise have a surface attached directly to objects. RFID tags, in contrast, are secured to objects by other means, for example by use of a plastic fastener, string or other fastening means.

A continuing desire exists for improved RFID devices and features.

SUMMARY OF THE INVENTION

A radio frequency identification (RFID) device has a loop antenna coupled to an RFID chip or interposer, for communication using near-field magnetic fields at frequencies in the UHF range. The device includes a conductive loop that is separated from yet is electrically coupled to the loop antenna. The conductive loop aids is providing an impedance match for resonant coupling between the antenna and the chip. The loop antenna may enclose a space that is so large that the loop antenna itself has an inductance that is too high to make a resonant coupling with the RFID chip. The presence of the conductive loop may reduce the effective inductance of the antenna (an inductance of the combined antenna and loop system) to the point where a resonant coupling between the antenna and the chip is possible. In addition, the conductive loop may act as a shield to prevent far-field relatively-long-range coupling between the antenna and RFID device readers or detectors. Thus the conductive loop may effectively provide an upper limit to the range of the RFID device.

According to an aspect of the invention, an RFID device includes: an RFID chip having an input capacitance, and having a predetermined UHF frequency or range of frequency of operation for sending and receiving signals; an RFID loop antenna electrically coupled to the RFID chip, wherein the RFID loop antenna has an enclosed area greater than 1 $cm^2$, wherein the antenna on its own has an unmodified inductance that is at least 20% greater than a desired inductance or range of inductances that would achieve resonance with the input capacitance, at the frequency or range of frequencies; and a conductive loop operatively coupled to the RFID, without being in contact with the RFID loop antenna. The RFID loop antenna and the conductive loop together couple to a chip with a modified inductance that is within 5% of the desired inductance or range of inductances.

According to another aspect of the invention, a method of configuring an RFID device includes the steps of: selecting an RFID chip having an input capacitance, and having a predetermined UHF frequency or range of frequency of operation for sending and receiving signals; selecting an RFID loop antenna to be electrically coupled to the RFID chip, wherein the RFID loop antenna has an enclosed area greater than 1 $cm^2$, wherein the antenna on its own has an unmodified inductance that is at least 20% greater than a desired inductance or range of inductances that would achieve resonance with the input capacitance, at the frequency or range of frequencies; and selecting a conductive loop to be operatively coupled to the RFID to reduce inductance of the RFID loop antenna to within 5% of the desired inductance or range of inductances.

According to yet another aspect of the invention, a method of forming an RFID device includes the steps of: forming an RFID loop antenna and a loop shield on a major surface of a dielectric material substrate; electrically coupling an RFID chip to the RFID loop antenna; and folding the dielectric material substrate so that the loop shield overlaps the RFID loop antenna.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, which are not necessarily to scale.

DETAILED DESCRIPTION

A radio frequency identification (RFID) device includes a conductive loop shield for a loop antenna. The shield may overlap the conductive loop antenna, with a gap in the loop shield that is opposite a portion of the antenna that couples to an RFID chip. The loop antenna may enclose an area that is large enough that the loop antenna by itself has an impedance that exceeds what would be required for optimally coupling to the RFID chip, for communication at a predetermined preferred frequency of operation of the RFID chip. The preferred frequency of operation may be a frequency or range of frequencies within the ultra high frequency (UHF) range of frequencies. The conductive loop shield provides a distributed capacitance to the loop antenna, which brings the inductance of the combined system of the loop antenna and the conductive shield down to an inductance level that allows impedance matching with the RFID chip (at the desired impedance or range of impedances). The use of the conductive loop allows the RFID device to function as a near-field magnetic communication device, utilizing a loop antenna having a larger area than would normally be possible for impedance-matching with RFID chip. The loop antenna and the conductive shield loop may be on opposed major surfaces of a dielectric material layer. In another embodiment, the RFID device may have a pair of conductive loop shields offset from and overlapping the RFID loop antenna in opposite directions. The conductive loop shield(s) may advantageously limit far-field coupling involving the RFID loop antenna. This may advantageously provide an upper limit of the range of the RFID device, preventing undesired long-range coupling and/or communication.

Figure 1:
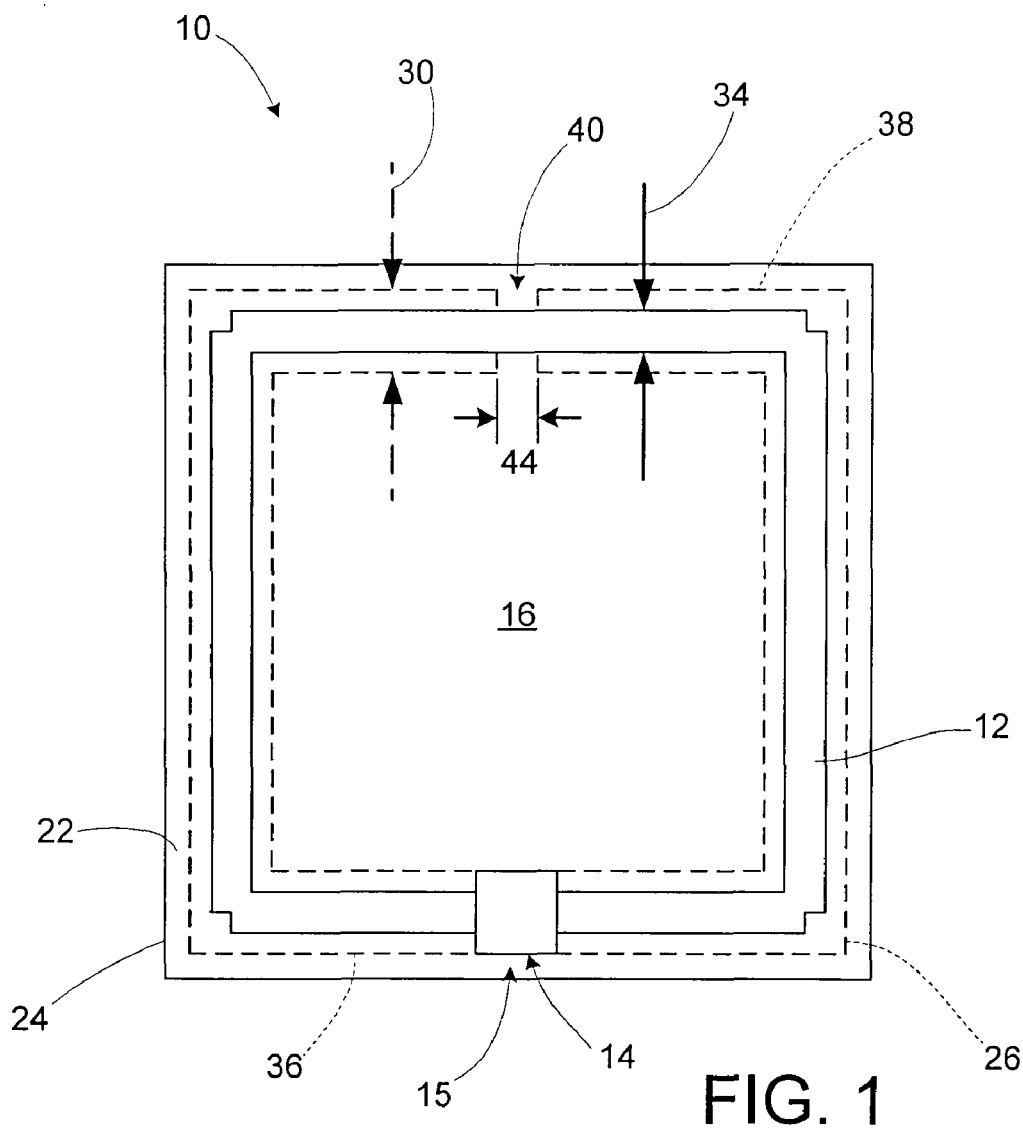
FIG. 1 is a plan view of an RFID device in accordance with an embodiment of the present invention.
Figure 2:
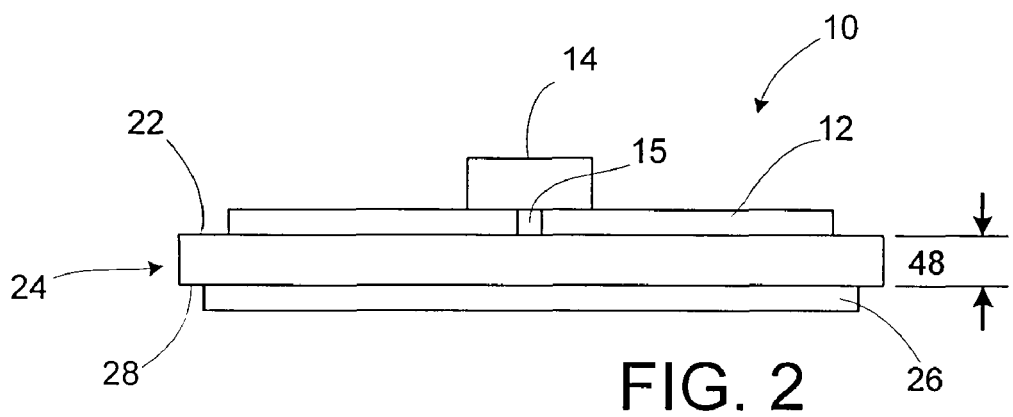
FIG. 2 is a side view of the RFID device of FIG. 1.
Figure 3:
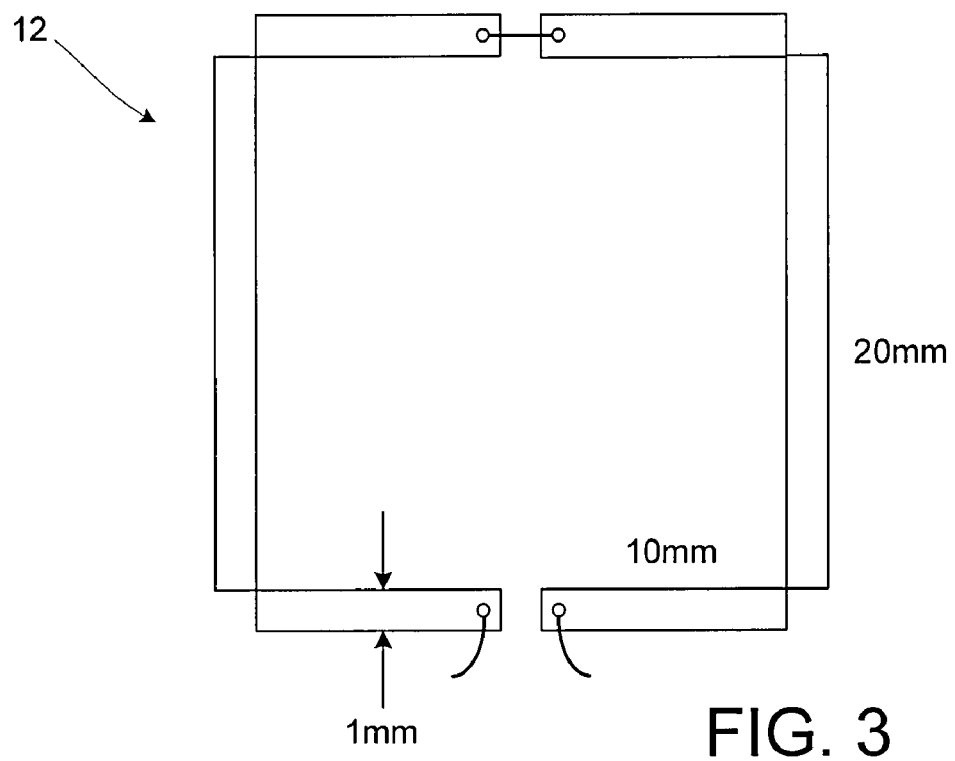
FIG. 3 is a plan view of an example configuration of a loop antenna usable as part of an embodiment of the present invention.

FIGS. 1 and 2 show an RFID device 10 that includes a loop antenna 12 that is electrically coupled to an RFID chip 14. The RFID chip 14 is or includes an integrated circuit configured to communicate with devices (such as readers and detectors) that are external to the RFID device 10. The loop antenna 12 is coupled to the chip 14 to send and/or receive signals as part of this communication. The chip 14 may be part of an interposer or strap, a structure that includes conductive leads for making an electrical connection between the chip 14 and the antenna 12. The term "chip" as used herein, should be understood to refer to either an RFID chip on its own, or an interposer or strap that includes an RFID chip. The electrical connection between the chip 14 and the antenna 12 ordinarily is a direct (ohmic) electrical connection, although it will be appreciated that indirect electrical connection methods, such as capacitive coupling, may be utilized in the electrical coupling between the chip 14 and the antenna 12.

The RFID chip 14 is connected to the RFID antenna 12 across an antenna gap 15 along one side or end of the loop antenna 12. The ends of the loop antenna 12 on either side of the antenna gap 15 are electrically coupled to respective contacts on the RFID chip 14.

The chip 14 has a preferred frequency or range of frequencies through which communication with the RFID device 10 is to be accomplished. The preferred frequency or range of frequencies for operating the RFID chip 14 may include one or more frequencies in the ultra high frequency (UHF) band. The preferred frequency or range of frequencies may be a frequency or frequency range at which the RFID chip 14 has particularly advantageous characteristics. Alternatively, the preferred frequency or range of frequencies may include one or more discreet frequencies or bands of frequencies which are standard for operation of RFID devices. An example of a typical UHF preferred frequency for communication is 915 MHz.

The RFID chip 14 has an input capacitance associated with it. Typically values for the input capacitance of the RFID chip 14 are 0.3 pF to 2.0 pF. In addition, some RFID chips have multiple inputs, which can be connected either in series or in parallel, extending the range of capacitances available. For example, in the cases above, a 2 input chip could be configured to have either 0.15 pF (series of the lowest values) or 4 pF (parallel of the highest values).

The RFID loop antenna 12 encloses an enclosed area 16. The loop antenna 12 may have any of a variety of suitable shapes, for example being circular or rectangular.

The RFID loop antenna 12 may be a single-turn loop, as is shown in FIGS. 1 and 2. Alternatively, the loop antenna may have multiple turns. It is well known that having multiple turns in a loop antenna increases the voltage of a signal received by the antenna.

The RFID loop antenna 12 is on a first major surface 22 of a dielectric material layer 24. The dielectric material layer 24 may be made of any of a variety of suitable dielectric materials for supporting the loop antenna 12. Examples of suitable materials include paper and a variety of suitable polymer materials.

The loop antenna 12 may be formed or placed on the dielectric material layer 24 and any of a variety of suitable well-known ways. To give just a few examples, the RFID loop antenna 12 may be etched from a metal layer, may be a patterned metal deposit, such as by physical deposition or chemical deposition, or may be a conductive material printed onto the first major surface 22. The loop antenna 14 may be made from any of a variety of suitable electrically-conductive materials.

A conductive loop 26 is located on a second major surface 28 of the dielectric material layer 24, on an opposite side from the first major surface 22. As explained in greater detail below, the conductive loop 26 is a structure made of electrically-conductive material, which is used to alter an inductance of the RFID loop antenna 12. The conductive loop 26 is not directly in contact with the RFID loop antenna 12. Nor is the conductive loop 26 in direct (ohmic) electrically communication with the RFID loop antenna 12. Instead the conductive loop 26 is capacitively coupled with the RFID loop antenna 12, so as to change the inductance of the RFID loop antenna 12.

The conductive loop 26 overlaps the RFID loop antenna 12. The RFID loop antenna 12 and the conductive loops are both substantially planar structures in the illustrated embodiment, with the loop antenna 12 and the conductive loop 26 on the substantially-parallel major surfaces 22 and 28. The conductive loop 26 overlaps the RFID loop antenna 12 in the sense that a projection of the RFID loop antenna 12 perpendicular to the plane of the antenna 12 is almost all (greater than 90%) within the conductive loop 26. The loop antenna 12 and the conductive loop 26 may be formed by any of a number of methods, such as etching, cutting, selectively deposition of a metal from a vapor or a liquid, or punching.

The conductive loop 26 has a conductive loop width 30 that is greater than an antenna width 34 of the RFID loop antenna 12. The ratio of the widths 30 and 34 may be between 1.5 and 15, although it will be appreciated that other widths may be utilized. In any event the width 30 should be so great as to effectively cause the conductive loop 26 to operate as a continuous conductive plane. A sufficient central opening must be maintained in the conductive loop 26 in order for the conductive loop 26 to operate as intended. The conductive loop width 30 may be selected to achieve a desired effect on the inductance of a given RFID loop antenna 12, as described further below.

The conductive loop 26 has a first conductive loop portion 36 that underlies the RFID chip 14 and connecting arms of the RFID loop antenna 12, and a second conductive loop portion 38 on an opposite side of the conductive loop 26. The second conductive loop portion 38 has a conductive loop gap 40, a separation between the ends of arms of the conductive loop 26. There is a capacitance associated with the conductive loop gap 40. The conductive loop gap 40 has a gap width 44 that may be selected to achieve desired results for the combined system of the RFID loop antenna 14 and the conductive loop 26. It will be appreciated that although the conductive loop gap may be a simple rectangle, other shapes, such as waves or curves, or interdigitated fingers, may be used, to alter the capacitance across the loop gap.

The RFID loop antenna 12 and the conductive loop 26 are separated from each other by the presence of the dielectric material layer 24. The dielectric material layer 24 has a thickness 48. The thickness 48 may be varied in order to achieve desired characteristics of the combination of the loop antenna 12 and the conductive loop 26. Typically the separation between the loop antenna 12 and the conductive loop 26 is a very small fraction of the operating wavelength, such as below 1 mm, or less than approximately 1/300$^{th}$ of an operating wavelength. In configuring the conductive loop 26 and the antenna 12, an electromagnetic simulator may be used to examine the interactions between the two structures.

Figure 4:
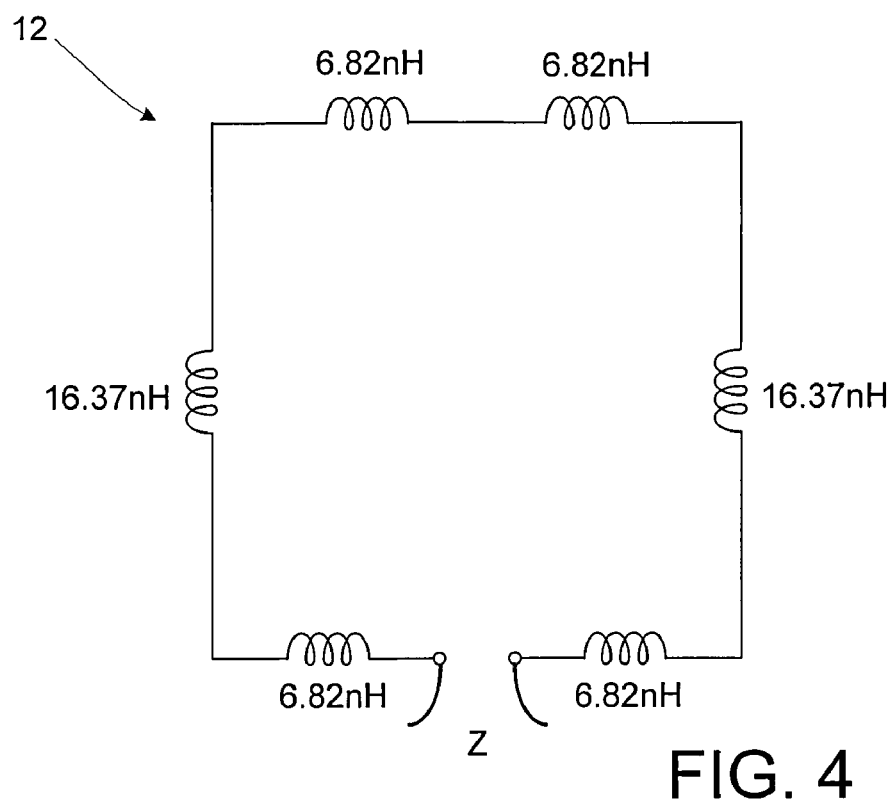
FIG. 4 is a model of the loop antenna of FIG. 3.
Figure 5:
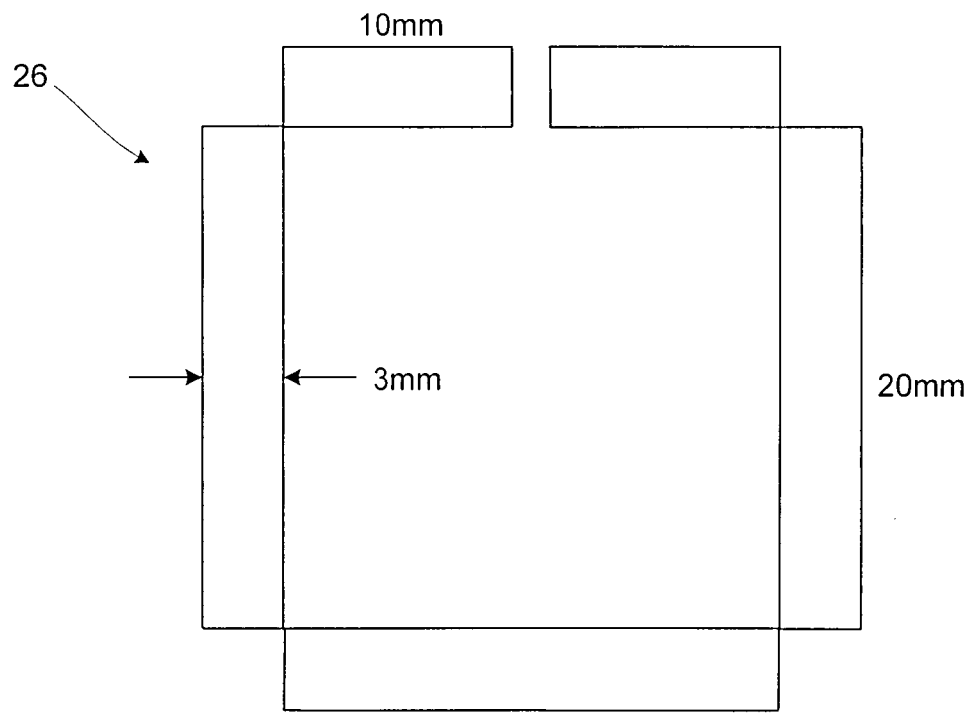
FIG. 5 is a plan view of an example configuration of a conductive loop usable as part of an embodiment of the present invention.
Figure 6:
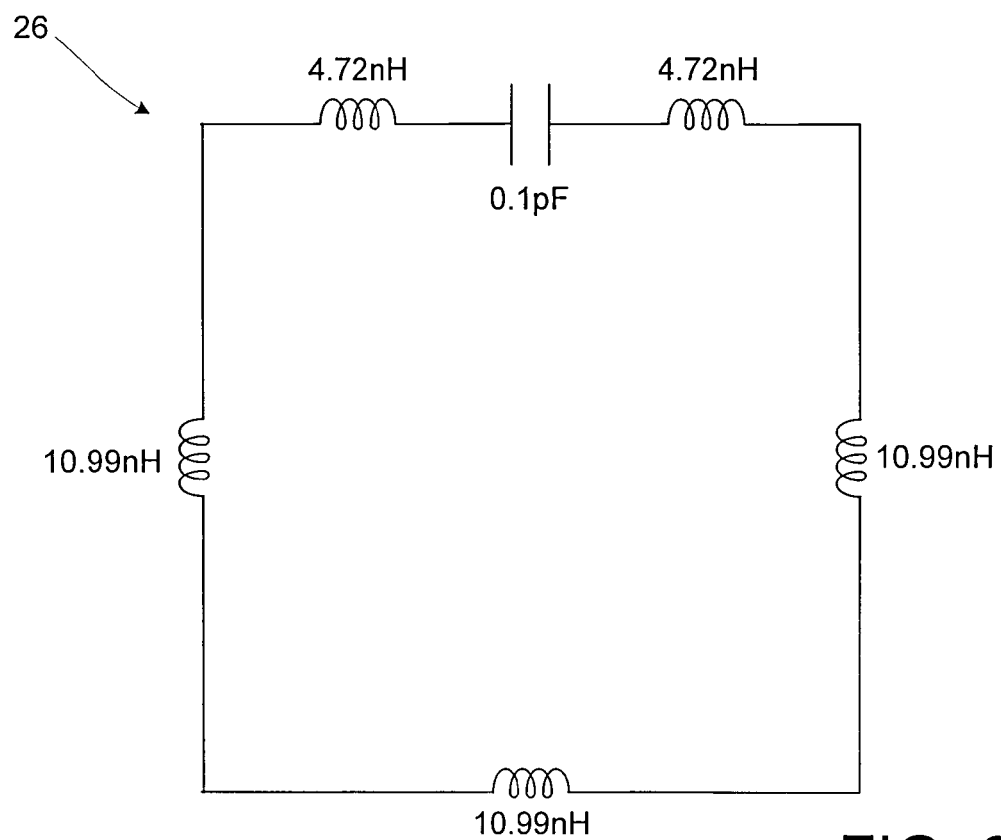
FIG. 6 is a model of the conductive loop of FIG. 5.
Figure 7:
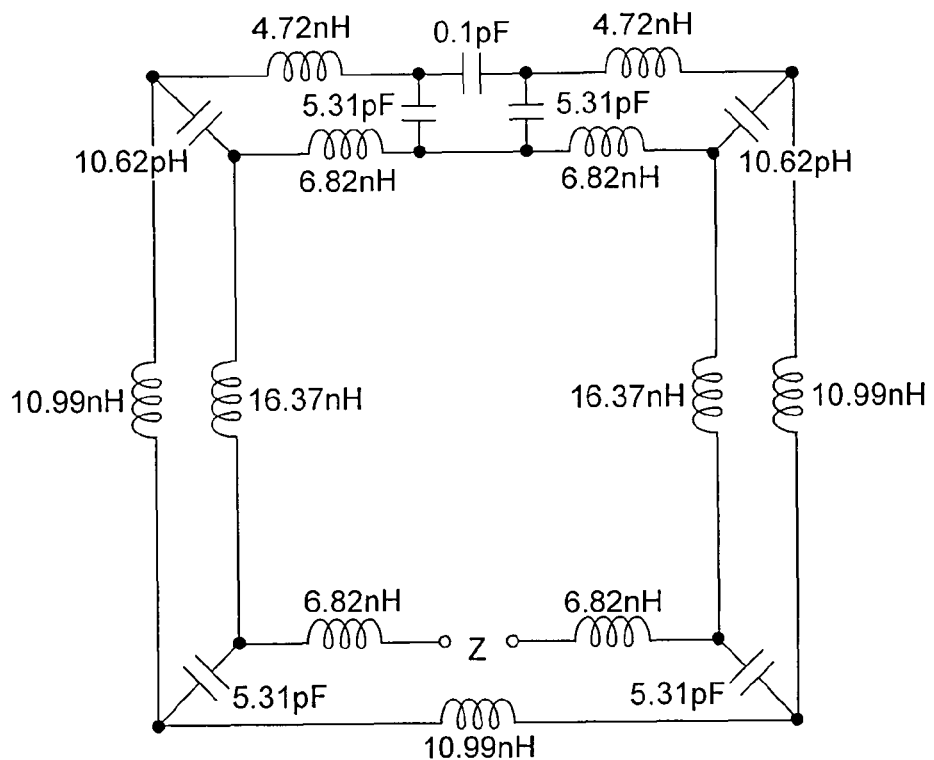
FIG. 7 is a model of the combination of the loop antenna of FIG. 3 and the conductive loop of FIG. 5.

FIGS. 3-7 illustrate an example of modeling of the interaction between the antenna 12 and the conductive loop 26. The loop antenna 12 having the example configuration shown in FIG. 3 (1 mm width and 20 mm×20 mm) is modeled as inductors when attached to an RFID chip, as illustrated in FIG. 4. The conductive loop 26 shown in FIG. 5 (3 mm width) is modeled in as inductors and capacitors, as illustrated in FIG. 6. The combined system of the loop antenna 12 and the conductive loop 26 is modeled as shown in FIG. 7. The capacitive connections between the loop antenna 12 and the conductive loop 26 are based on overlapping of the two structures across a 50 µm-thick dielectric separator with a dielectric constant of 3.

The impedance Z across the loop antenna 12 is 59.57 nH when considering the antenna alone. At a frequency of 900 MHz this is resonant with a 0.524 pF capacitance.

When coupled to the conductive loop 26 as modeled in FIG. E, the loop antenna 12 presents to a coupling chip an impedance Z of 7.63 nH. At a frequency of 900 MHz this is resonant with a 4.09 pF capacitance.

The RFID device 10 is configure to couple with other devices using primarily a magnetic field, and operating primarily in the near field. The term "near field" is used in contrast to the "far field" that is farther from the device. Both terms describe the fields around an antenna (or any other electromagnetic radiation source). In a three region model, the far field is where the dominant terms in Maxwell's equation are those proportional to $1/r$, where r is the distance from the antenna (or other radiation source). The near field encompasses a reactive field or Fresnel zone, where the dominant terms are proportional to $1/r^3$, and a near radiation field or transition zone, where the dominant terms are proportional to $1/r^2$. The boundary between the near field and the far field is often taken to be (and may be considered herein as) a distance from the antenna equal to $\lambda/2\pi$, where $\lambda$ is the wavelength of the radiation being emitted by the antenna. Further details regarding the boundary between the near field and the far field may be found in Capps, Charles, "Near field or far field?," EDN, Aug. 16, 2001, available at www.edn.com/contents/images/150828.pdf.

"Proximity coupling" or "proximity field coupling" occurs at a range that goes beyond near field coupling, beyond the reactive near field and the radiating near field to include a farther region in which sufficient energy may be transferred to operate tags via a distributed read structure. As noted above, the boundary between the near field and the far field is often taken to be a distance from the antenna equal to $\lambda/2\pi$, where $\lambda$ is the wavelength of the radiation being emitted by the antenna. However it should be realized that sufficient energy is available to operate a RFID device designed to couple via magnetic or electric field coupling at ranges much greater than this depending on the distributed antenna design and power input via the coupler. It is commonly understood that the region where powering via a primarily single field component, retaining the advantageous characteristics of near field coupling, is possible out to approximately 3 wavelengths away from the read system, although coupling drops rapidly with distance. Therefore proximity coupling may be defined as extending out to a range of about 3 wavelengths of energy emitted, away from the read system.

By coupling using magnetic fields, performance is largely unaffected by the presence of dielectrics such as water. Magnetic coupling advantageously can be precisely controlled by the design of suitable reader antennas. Another advantage is that near-field magnetic coupling has a strength that is inversely proportional to distance to the third power. This results in a well defined cutoff in the read range of antennas and devices. Use of UHF frequencies also may result in RFID devices that have a lower cost than devices which are suitable for operation at lower frequencies.

However, one disadvantage to using magnetic fields for near-field coupling is that as the size of the antenna is increased the inductance of the antenna rises above values where it is possible to achieve a resonant coupling with an attached RFID chip. The RFID chip 14 may have an input capacitance in the range of 0.4 pF to 1.6 pF. For operation at a typical UHF frequency, for instance 915 Hz, the corresponding inductance to achieve a resonant match would fall in the range of 18.9 nH to 75.6 nH. The area 16 enclosed by the loop antenna 12 is large enough that the inductance of the loop antenna 12, on its own, rises above the desired range of inductance values. For a 1 mm line width, a 20 mm×20 mm loop has an inductance of 59.57 nH, which resonates nominally with 0.524 fF at 900 MHz. A 30 mm×30 mm loop gives 103.7 nH, which would be resonant with 300 fF at 900 MHz, which is above the desirable range. So for a 1 mm line width, an enclosed area 16 of greater than about 9 cm$^2$ would force the antenna 12 above the desired range of inductance values. However it will be appreciated that the actual limit also depends on the line width chosen. Thus coupling the RFID loop antenna 12 on its own to the RFID chip 14 does not allow for a resonant or impedance-matched coupling between the antenna 12 and the chip 14, at the UHF frequency or frequencies that are preferred for operation of the RFID chip 14.

Another problem encountered with using the RFID loop antenna 12 on its own is that the relatively large antenna structure, with the large enclosed area 16, becomes a significant fraction of a wave length of the preferred frequency or frequencies for sending and receiving signals. This can cause the RFID loop antenna 12 to start operating as a far-field antenna. Such far-field signals fall off more slowly than near-field signals, as a function of the square of distance from the RFID device 10. Whereas near-field signals are inversely proportional to the cube of distance, far-field signals are inversely proportional to the square of distance. Thus the desire to have near-field magnetic-field communication may be undermined by undesired far-field functionality.

It will be appreciated that it may be desirable to limit the read range of the RFID device 10 in order to confine interactions with RFID devices to a certain desired area or space. For example, it may be desirable to only detect RFID devices passing through a doorway which has not incorporated RFID device reader or detector. In such a situation long-range readability may be a liability, since long-range readability would result in detection of RFID devices outside of the doorway.

Both of these problems may be addressed by proper the width of the conductive loop 26, the conductive loop gap width 44, other aspects of the configuration of the conductive loop 26 and the distance between the RFID loop antenna 12 and the conductive loop 26 (in the illustrated embodiment the dielectric material thickness 48), all may be selected to suitably configure the conductive loop 26. The conductive loop 26 may be operatively coupled to the RFID loop antenna 12 such that the combined impedance of the RFID loop antenna 12 and the conductive loop 26 is less than that of the loop antenna 12 alone. The dominant coupling between the loop antenna 12 and the conductive loop 26 is expected to be capacitive for the small separation between the two that is envisaged. However if current is induced in the conductive loop 26 it will generate a magnetic field and some magnetic field coupling could occur. The actual mechanism for the operative coupling between the loop antenna 12 and the conductive loop 26 is dependant on the dimensions and separation of the two structures, and can have both magnetic and electric field aspects (mutual inductance and capacitance. The conductive loop 26 may have a defined resonance with respect to the antenna loop 12, resulting in a controlled effect on the primarily magnetic coupling between the RFID device 10 and a suitable reader. Together the antenna loop 12 and the conductive loop 26 present the desired reduced inductance (below the inductance of the RFID loop antenna 12 alone) to the contacts of the RFID chip 14. The presence of the conductive loop 26 allows the desired resonant coupling or impedance-matched coupling to be achieved.

The configuration of the conductive loop 26 may be determined at least in part by modeling expected behavior of one or more proposed configurations. The modeling itself may be carried out using an electromagnetic simulator, such as an Ansoft HFSS. The method would involve altering the dimensions and parameters to achieve the desired impedance and predicted far field and near field propagation characteristics. In the optimization, certain parameters will be easier and/or more practical to change than others. For example the substrate dielectric constant K value will be relatively fixed. Also the separation between the loop antenna 12 and the conductive loop 26 (the thickness of the dielectric material 14) may also be relatively fixed, since it may be desirable for economic reasons to use standard substrate materials. However, the width of the lines and overall lengths of the loop antenna 12 and the conductive loop 26 may be less constrained. The length may be constrained primarily by the overall dimensions required for the device. The widths may be constrained partly by the process used to make the device. In particular if the lines are formed by die cutting we have a lower limit of 1 mm width and a limited radius, so that the radius should be greater than about 0.75 mm.

Figure 8:
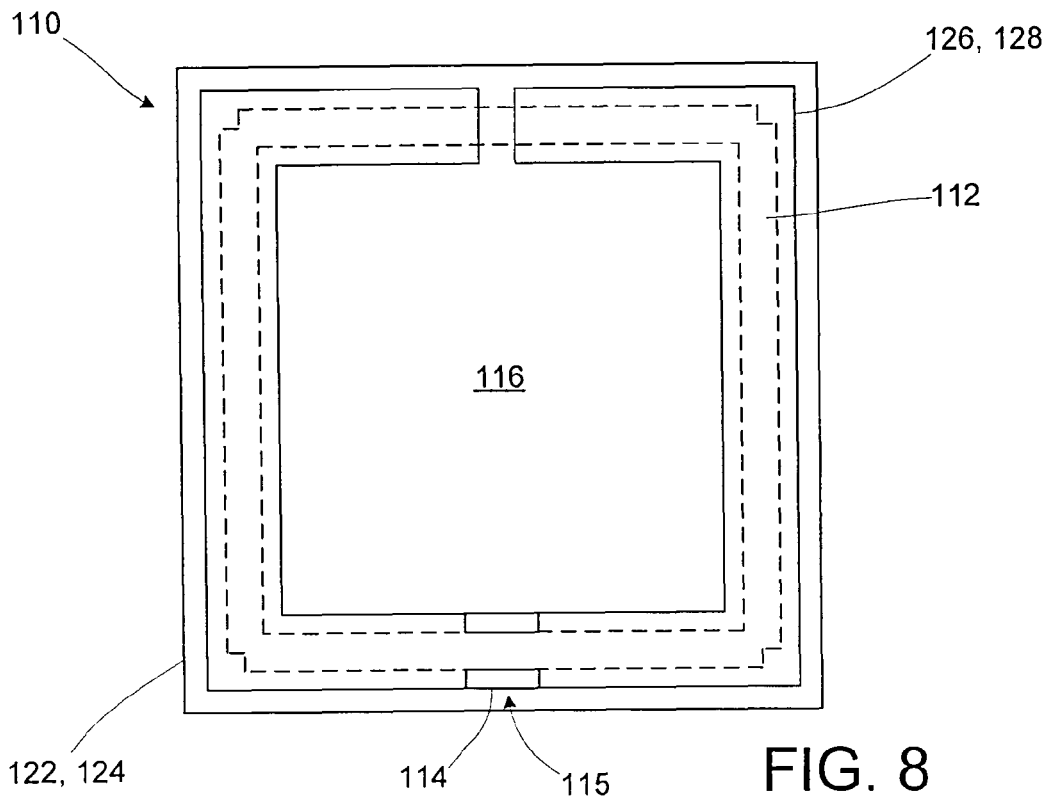
FIG. 8 is a plan view of a second embodiment RFID device in accordance with the present invention.
Figure 9:
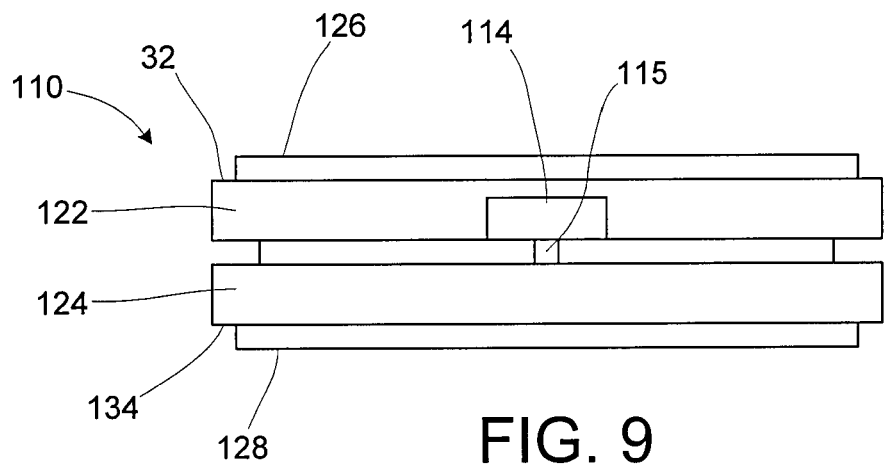
FIG. 9 is a side view of the RFID device of FIG. 8.

FIGS. 8 and 9 show an alternate embodiment, an RFID device 110 having an RFID loop antenna 112 coupled to an RFID chip 114. The loop antenna 112 may have characteristics similar to those described above with regard to the loop antenna 12 of the RFID device 10 (FIG. 1), including having an antenna gap 115 and enclosing an area 116.

The RFID loop antenna 112 and the RFID chip 114 are sandwiched between a pair of dielectric material layers 122 and 124. The dielectric material layers 122 and 124 may have characteristics similar to those of the dielectric material layer 24 (FIGS. 1 and 2). Respective conductive loops 126 and 128 are located on respective major surfaces 132 and 134 of the dielectric material layers 122 and 124. The major surfaces 132 and 134 are spaced from the loop antenna 112. The dielectric material layers 122 and 124 are thus between the respective conductive loops 126 and 128, and the RFID loop antenna 112 and the RFID chip 114. The conductive loops 126 and 128 may have characteristics similar to those of the conductive loop 26 (FIGS. 1 and 2).

The conductive loops 126 and 128 may perform functions similar to those described above with regard to the conductive loop 26. The conductive loops 126 and 128 may reduce the inductance of the RFID loop antenna 112, allowing for a resonant coupling between the RFID loop antenna 112 and the RFID chip 114. In addition, the conductive loops 126 and 128 may provide electrical shielding for the RFID loop antenna 112. This may reduce far-field coupling involving the antenna 112, and thus may provide an effective upper limit for the range of readability for the RFID device 110.

It will be appreciated that the use of two conductive loops 126 and 128, separated from the loop antenna 112 in opposite directions, may provide more effective shielding against far-field electric field interactions involving the RFID device 110. The conductive loops 126 and 128 may be substantially identical to one another, or alternatively may be different in material and/or configuration.

Figure 10:
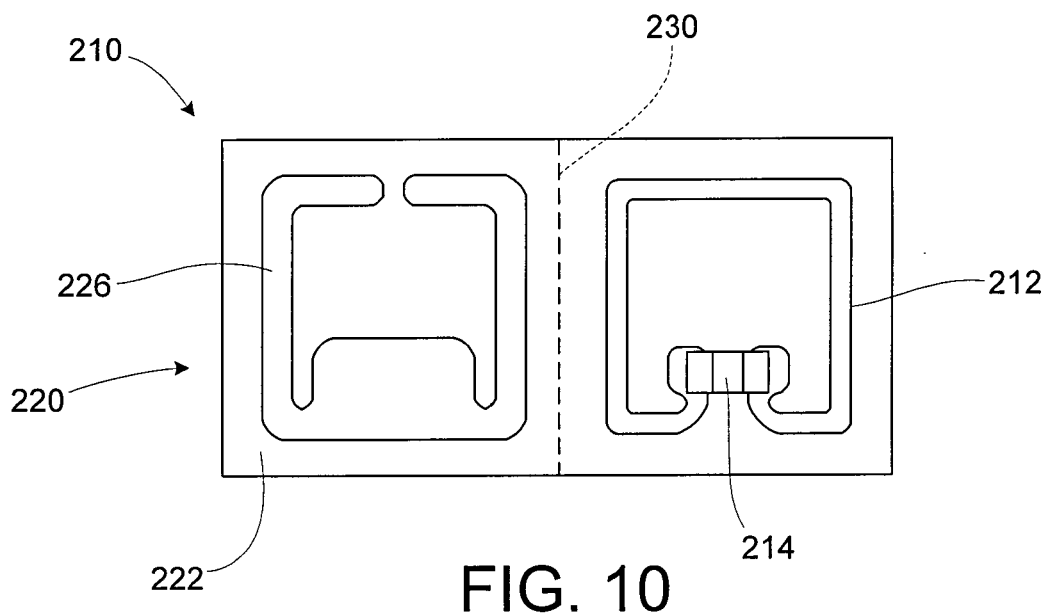
FIG. 10 is a plan view of an RFID device in accordance with a third embodiment of the present invention, prior to a folding operation to bring the RFID device into a final configuration.
Figure 11:
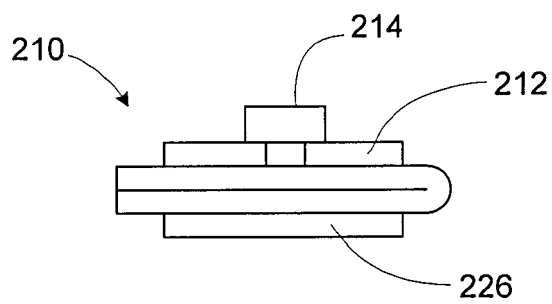
FIG. 11 is a side view of the RFID device of FIG. 10, after a folding operation.

FIGS. 10 and 11 illustrate another embodiment, an RFID device 210 that uses a folded over dielectric substrate 220. An RFID loop antenna 212 and a conductive loop 226 are initially formed on the same major surface 222 of the dielectric substrate 220. This is shown in FIG. 10, with an RFID chip or interposer 214 coupled to the RFID loop antenna 212. The dielectric substrate 220 is then folded along a fold line 230, to produce the configuration shown in FIG. 11. The fold line 230 is located between the RFID loop antenna 212 and the conductive loop 226. The result is that in the final configuration the RFID loop antenna 212 and the conductive loop 226 are on opposite sides of the folded over dielectric substrate 220. The dielectric substrate 220 may be maintained in the folded-over configuration shown in FIG. 6 by use of a suitable adhesive or other suitable mechanisms.

The configurations and functions of the individual components of the RFID device 210 may be similar to those of corresponding parts of other RFID devices described herein. It will be appreciated that manufacture of the RFID device 210 may be made easier and less costly by the ability to initially form the RFID loop antenna 212 and the conductive loop 226 on the same major surface 222 of the dielectric substrate 220.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An RFID device comprising:
   an RFID chip having an input capacitance, and having a predetermined UHF frequency or range of frequency of operation for sending and receiving signals;
   an RFID loop antenna electrically coupled to the RFID chip, wherein the RFID loop antenna has an enclosed area greater than 1 cm², wherein the antenna on its own has an unmodified inductance that is at least 20% greater than a desired inductance or range of inductances that would achieve resonance with the input capacitance, at the frequency or range of frequencies; and a conductive loop operatively coupled to the RFID loop antenna, without being in contact with the RFID loop antenna which produces a distributive capacitance that modifies the loop antenna's inductance;

wherein the RFID loop antenna and the conductive loop together couple to a chip with a modified inductance that is within 5% of the desired inductance or range of inductances.

2. The RFID device of claim 1, further comprising a dielectric material between the RFID loop antenna and the conductive loop.

3. The RFID device of claim 2,
wherein the dielectric material is a dielectric layer; and
wherein the RFID loop antenna and the conductive loop are on opposite major surfaces of the dielectric layer.

4. The RFID device of claim 3, wherein the dielectric layer has a thickness of 1 mm or less.

5. The RFID device of claim 3, wherein the dielectric layer is a folded-over layer, with the RFID loop antenna and the conductive loop on the same side of the folded-over layer prior to the folding of the folded-over layer.

6. The RFID device of claim 1, wherein the conductive loop overlaps at least 90% of the RFID loop antenna.

7. The RFID device of claim 6, wherein a width of the conductive loop is at least 1.5 times a width of the RFID loop antenna.

8. The RFID device of claim 7, wherein a width of the conductive loop is between 1.5 and 15 times a width of the RFID loop antenna.

9. The RFID device of claim 7, further comprising an additional conductive loop that overlaps at least 90% of the RFID loop antenna.

10. The RFID device of claim 9, wherein the conductive loops are substantially parallel to one another, offset on opposite sides of the RFID loop antenna.

11. The RFID device of claim 1, wherein the conductive loop has a conductive loop gap therein.

12. The RFID device of claim 11, wherein the conductive loop gap is on an opposite side of the conductive loop from a portion of the conductive loop that is closest to where the chip is coupled to the RFID loop antenna.

13. A method of configuring an RFID device, the method comprising:
selecting an RFID chip having an input capacitance, and having a predetermined UHF frequency or range of frequency of operation for sending and receiving signals;
selecting an RFID loop antenna to be electrically coupled to the RFID chip, wherein the RFID loop antenna has an enclosed area greater than 1 cm², wherein the antenna on its own has an unmodified inductance that is at least 20% greater than a desired inductance or range of inductances that would achieve resonance with the input capacitance, at the frequency or range of frequencies; and
selecting a conductive loop to be operatively coupled to the RFID loop antenna which provides a distributed capacitance to reduce inductance of the RFID loop antenna to within 5% of the desired inductance or range of inductances; and
forming an RFID device by electrically coupling the selected loop antenna to the chip and operatively coupling the selected conductive loop to the selected loop antenna.

14. The method of claim 13, wherein the selecting the conductive loop includes modeling.

15. The method of claim 14, wherein the modeling includes modeling with an electromagnetic simulator.

16. The method of claim 13, wherein the selecting the conductive loop includes limiting far field range.

17. The method of claim 13, wherein the selecting includes selecting a width of the conductive loop to achieve the reduction of the inductance of the RFID loop antenna.

* * * * *